Oct. 9, 1945. T. ULRICH 2,386,280
VEHICLE BODY
Original Filed July 17, 1941 4 Sheets-Sheet 3

INVENTOR
Theodore Ulrich
BY John P. Tarbox
ATTORNEY

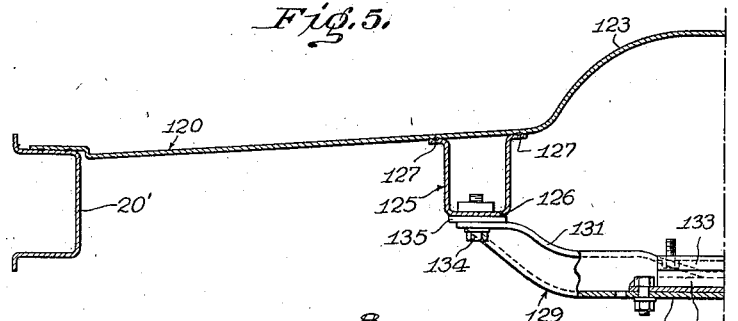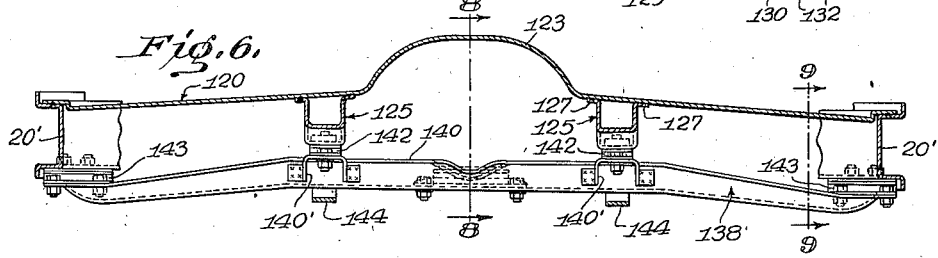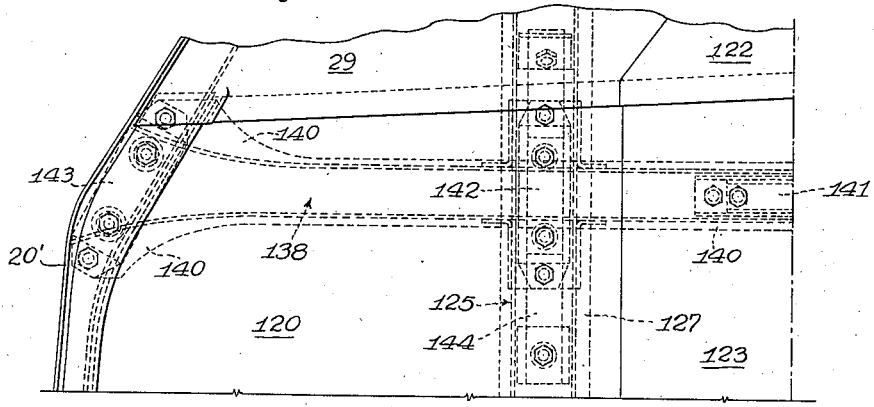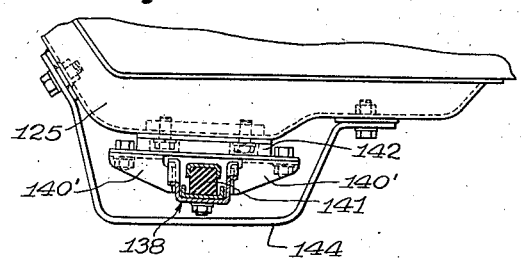

Patented Oct. 9, 1945

2,386,280

UNITED STATES PATENT OFFICE 2,386,280

VEHICLE BODY

Theodore Ulrich, Bridgeport, Conn., assignor to Edward G. Budd Manufacturing Company, Philadelphia, Pa., a corporation of Pennsylvania Original application July 17, 1941, Serial No. 402,877. Divided and this application April 23, 1942, Serial No. 440,131

4 Claims. (Cl. 296—28)

The invention refers to a vehicle body and especially to those details thereof which constitute or affect the motor suspension; more particularly the invention refers to an automobile body of the self-sustaining type, that is, a structure in which the chassis forms simultaneously a part of the body proper.

It is among the objects of the invention to simplify the construction of the vehicle as far as the motor suspension and adjacent parts are concerned.

A further object of the invention is to reduce the weight of the vehicle without decrease but rather accompanied by an increase of strength.

The invention has outstandingly to do with the motor suspension for self-sustaining bodies of the type disclosed in the inventor's applications Serial No. 191,396, filed February 19, 1938, for End wall construction for vehicle bodies, now Patent No. 2,289,395; Serial No. 299,595, filed October 16, 1939, for Vehicle body; Serial No. 349,922, filed August 2, 1940, for Vehicle structure especially tonneau bottom structure, now Patent No. 2,370,-211; in the application of Deisley, Ulrich and Lindsay, Serial No. 349,704, filed August 2, 1940, for Vehicle structure especially vehicle front end structure, now Patent No. 2,380,031; in the application of the inventor and Lindsay, Serial No. 430,060, filed February 9, 1942, for Vehicle body underframe or chassis; and in the inventor's applications Serial No. 402,878, filed July 17, 1941, for Body for vehicles, especially for pleasure automobiles; and Serial No. 402,877, filed July 17, 1941, for Wheel and motor suspension, especially for automobiles, of which the present application is a division.

The main features of the invention consist in in the arrangement of the motor suspension for an automobile in such a manner that the stresses are evenly distributed into the self-sustaining combined body and chassis structure.

Other features consist in improvements of the combined body and chassis structure itself by which greater strength and rigidity is attained and the attachment of the power unit and the wheel suspension is facilitated and improved.

Other objects and advantages of the invention, as well as its details, will become apparent from the following description of some embodiments when read in connection with the attached drawings.

In the drawings:

Figure 5 is a fragmentary transverse section along line 5—5 of Figure 3 on about the scale of Figure 4;

Figure 6 is a section similar to Figure 5, yet of a modified form of the motor suspension and on a smaller scale;

Figure 7 is a fragmentary plan view of the parts shown in Figure 6 on a larger scale;

Figures 8 and 9 are fragmentary sections along the correspondingly numbered lines of Figure 6 and on about the scale of Figure 7.

Figure 1:
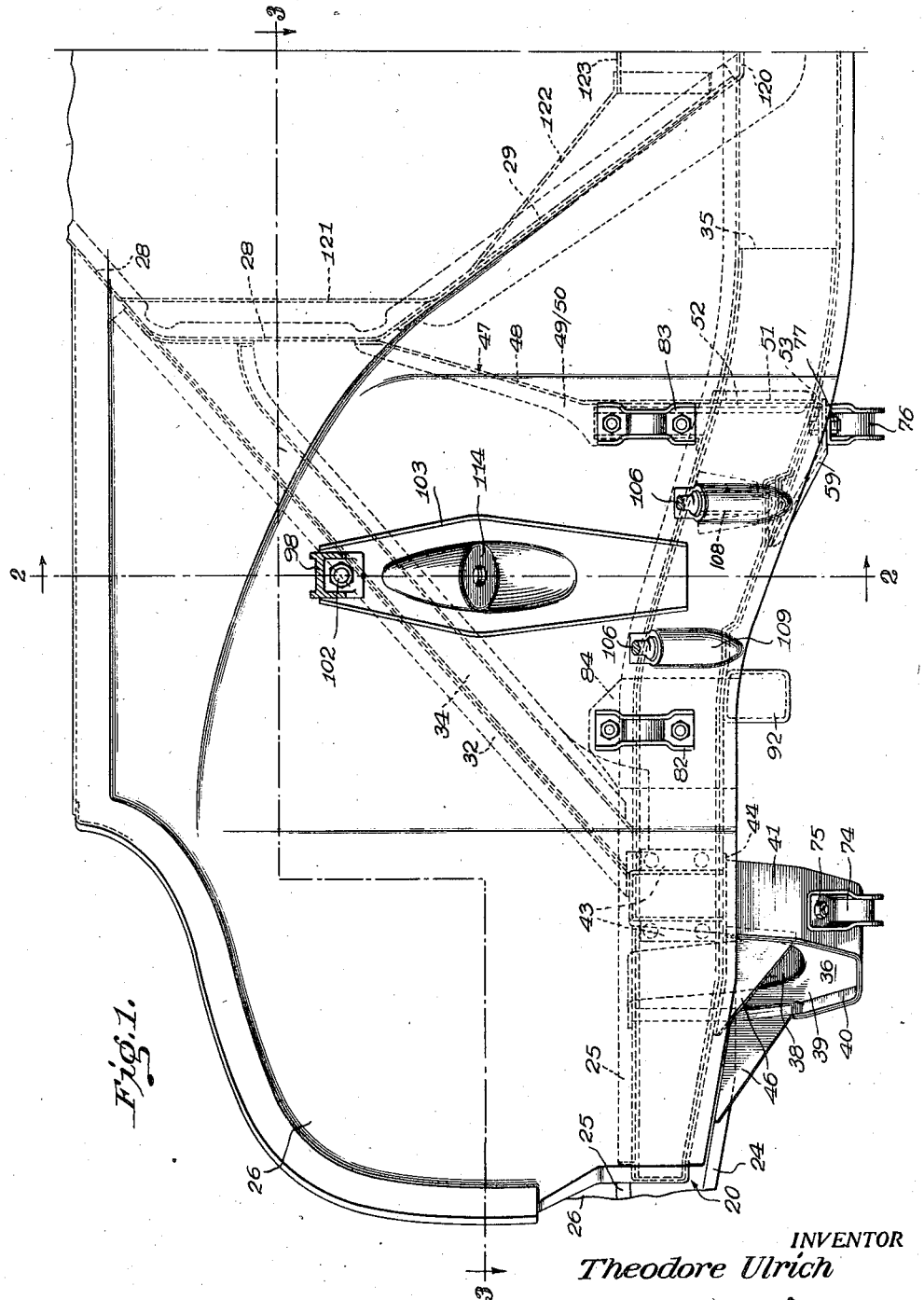
Figure 1 is a fragmentary side elevation of the front end of an automobile body, viewed in the direction of the arrow 1 of Figure 3.

The construction of the self-sustained combined body and chassis structure, part of which is shown in the drawings, is in principle largely the same as disclosed in the before mentioned applications, especially in the aforesaid applications Serial No. 349,704, Patent No. 2,380,031, and Serial No. 402,878.

Figure 2:
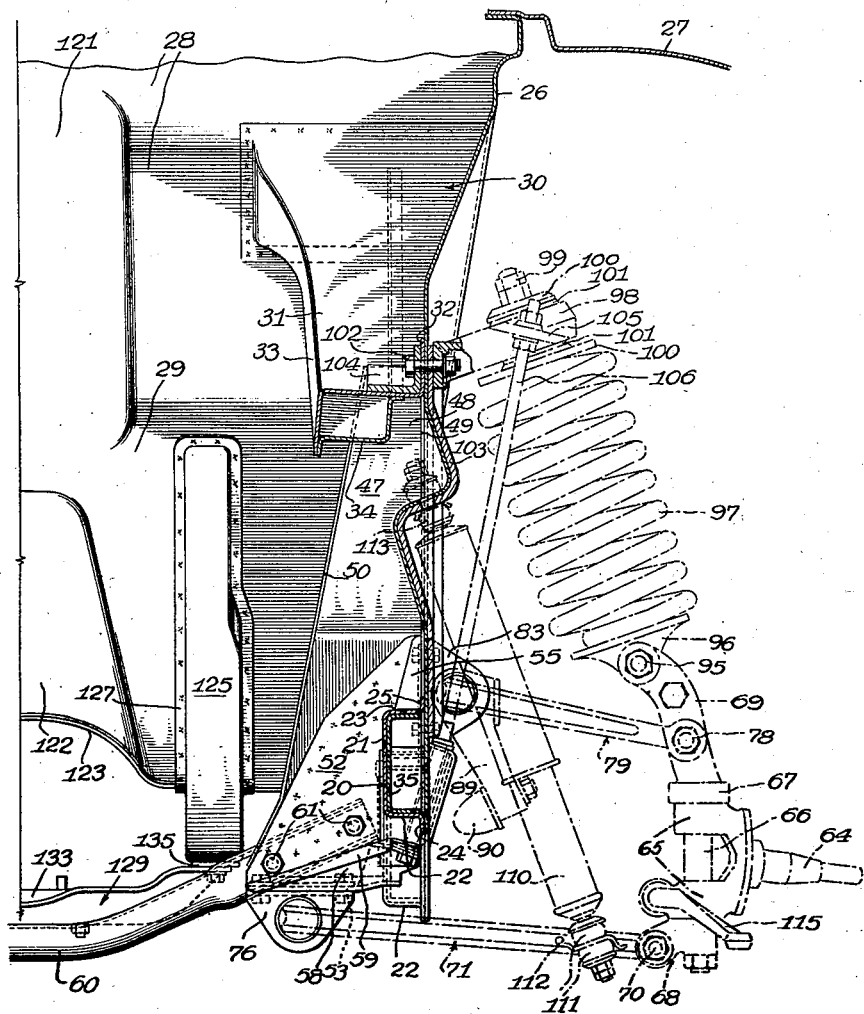
Figure 2 is a fragmentary front elevation of certain body parts shown in Figure 1, partly in section along line 2—2 of Figure 1, the suspension means for one wheel being indicated by dash-and-dot lines.
Figure 3:
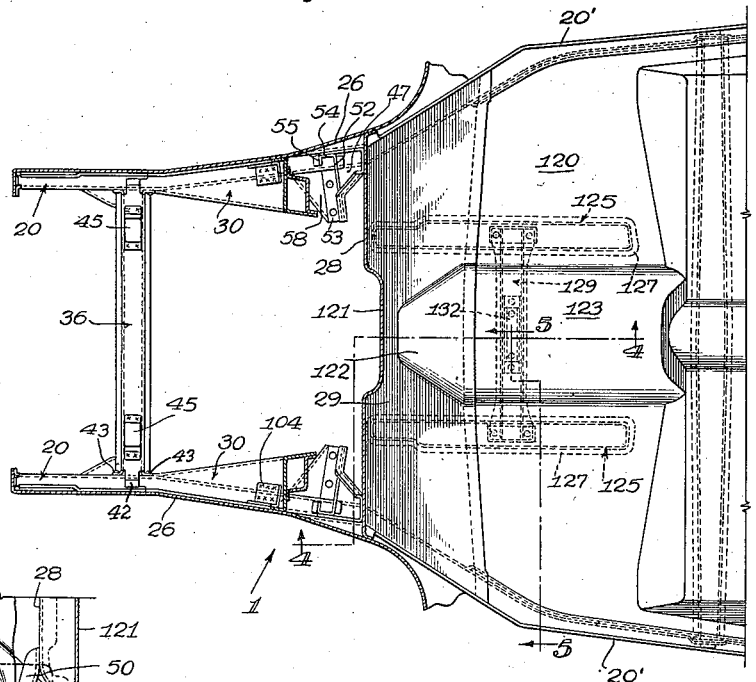
Figure 3 is a fragmentary plan view of the front end of the body partly in section along line 3—3 of Figure 1, yet on a smaller scale and extending over the entire width of the underframe structure and farther to the rear.
Figure 4:
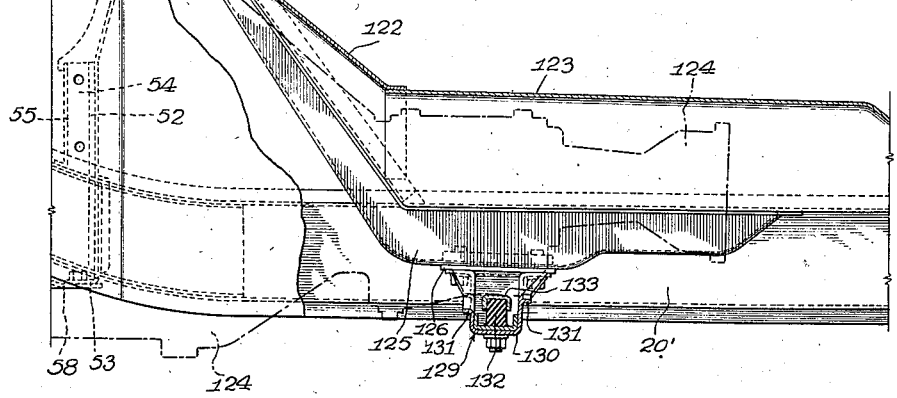
Figure 4 is a fragmentary vertical, longitudinal section along line 4—4 of Figure 3 on a larger scale.

The front end structure of the body comprises outwardly facing channel-section sill members 20 with a bottom wall 21, a lower side wall 22, an upper side wall 23, and marginal flanges 24, 25. These sill members 20 are connected to and rearwardly continued by similarly shaped sill members 20'. The flanges 24, 25 serve for fastening, such as by electric spot welding, each member 20 to the adjacent body side wall panel 26 which constitutes, in the front region, the skirt of the wheel housing, and is covered in the finished car by the fender 27, a fragmentary part of the latter being shown in section in Figure 2. The details of the fender arrangement are disclosed in the inventor's aforesaid application Serial No. 402,878.

The side wall panels 26, on different sides of the car, are interconnected by the dash board 28 and the toe board 29. The forward portions of the sill members 20, and the side panels 26 are braced by upwardly and rearwardly inclined members 30. The members 30 are Z-shaped in section having a web 31, an outer arm 32 and an inner arm 33. The outer arm 32 overlies and is fastened to the inner side of the panel 26, such as by spot welding. The margin of the inner arm 33 is connected to a flanged angle-section member 34, which latter forms with the web 31 and the flange 32 of the member 30, a box-section structure. The upper ends of the members 30 and 34 are rigidly connected to the dash board 28, and their lower ends to the sill member 20. The general arrangement of the dash and toe boards 28, 29 and of the reinforcements 30, 34 and the connection of these members to the side panels 26 and to the sill members 20, are substantially the same as described, for instance, in the aforesaid application Serial No. 349,704, Patent No. 2,380,031.

Each side sill member 20 is reinforced in its interior by a channel-section member 35 which extends from the front end of the sill members to a point slightly behind the dash board 28. In the region of the connection between the side sill members 20 and the inclined reinforcements 30, a cross sill 36 is inserted. This cross-member consists of a downwardly-facing channel-section member with an upper bottom wall 38, side walls 39 and marginal flanges 40. The open mouth of the member 36 is closed by a strip 41 which is fastened, such as by electric spot welding, to the flanges 40. The ends of the member 36 are provided with extensions 42 and tongues 43 by means of which they overlap and are fastened to the side sill members 20. The member 41 likewise overlaps with its end extension 44 the side sill 20 and is fastened thereto. The cross-member 36 is downwardly bent between the two side sill members 20 so as to make room for the motor unit. Brackets 45 on the cross-member 36 serve for the support of the front end of the motor unit by means of resilient cushions (not shown). The connection between the cross-member 36 and the side sill members 20 is further reinforced by triangular brackets 46, generally angle-shaped in cross-section. One arm of these brackets overlaps and is fastened to the flange 40 of the cross-member 36, whereas the other arm overlaps and is fastened to the lower side wall 22 of the side sill member 20.

A bracket plate 47 on each side of the body, having a generally transversely and vertically arranged web 48 and marginal forwardly directed flanges 49 and 50, has its upper end attached to the lower marginal portion of the dash board 28. The flange 49 of this plate is fastened to the adjacent side panel member 26. In the lower region, the member 47 overlaps and is fastened to the inner wall 21 of the side sill member by means of a rearwardly directed flange 51.

The lower portion of each plate 47 is reinforced by a second plate 52 which overlaps and is fastened, such as by spot welding, to the web 48 of the plate 47. The lower margin of the plate 52 is provided with a forwardly directed flange 53 and the outer margin with a forwardly directed flange 54, which latter is continued by an inwardly directed flange 55. The flange 54 overlaps and is fastened to the flange 49 of the plate 47. The main body of the plate 52 is cut out so as to accommodate the side sill member 20, and the cut-out portion as well as the flange 55 are fastened to the top wall 23 of the side sill member 20.

A third bracket plate 58 underlies and is fastened to the flange 53 of plate 52 and the lower wall 22 of the adjacent side sill member 20. The rearwardly and inwardly inclined forward margin of the plate 58 is reinforced by a downwardly directed flange 59.

In the region of the overlap between the plates 47 and 52, a transverse tubular member 60 is fastened by means of bolts 61. The structure composed of the plates 47, 52, 58 and the cross-member 60 affords a very substantial reinforcement for the combined body and chassis construction in this region for a purpose which will become apparent from the following description of the wheel suspension proper.

Each of the two front wheels (not shown) is rotatably supported on a stub axle 64. The bifurcated inner portion 65 of each stub axle 64 is supported rotatably about a substantially vertical axis on a king pin 66 between an upper collar 67 and a lower collar member 68. Rigidly connected to and preferably forming one integral portion with the king pin 66 is an upwardly directed bifurcated extension 69.

Journalled at 70 to the member 68 is the apex of a V- or triangular-shaped link 71. The inner ends of the link are journalled respectively in a bearing 74 which is secured by bolts 75 to the underside 41 of the cross-member 36, and in a bearing 76 which is fastened by bolts 77 to the underside of the plate 58 where the latter is reinforced by flange 53 of the plate 52.

Journalled to the king pin extension 69 at 78 is the apex of a second V- or triangular-shaped member 79 having the inner ends of its arms journalled in bearings 82, 83, respectively. The bearing 82 is bolted to the panel 26 and the sill member 20, which latter are reinforced in this region such as by a plate 84. The bearing 83 is bolted to the side panel 26 in the region where the latter is reinforced by the flange 49 of the plate 47 and the flanges 54, 55 of the plate 52.

The inner ends of the arms of the upper link 79 are rigidly connected or integrally formed with a short downwardly extending lever 89. The free end of this lever is provided with an exchangeable rubber cushion 90. Excessive downward movement of the links 81 will bring the cushions 90 in contact with the bracket 92—Figure 1—attached to the side sill member 20.

Journalled to the king pin extension 69 by means of a bolt 95 is a plate 96 which holds and supports the lower end of a rubber-covered helical spring 97. The upper end of this spring is fastened to a bracket 98 by means of a bolt and nuts 99, plates 100, and two rubber cushions 101. The bracket 98 has its inner end fastened by bolt 102 to the side panel 26 and the inclined brace 30. The side wall is reinforced in this region by a welded-on heavy outer stamping 103, and the brace 30 is reinforced by a welded-on angle-section bracket 104.

The bracket 98 is provided on both sides of its connection to the spring 97 with wings 105. Stay bolts 106 extend through holes of and are fastened to these wings 105. The stay bolts 106 have their lower ends extended through and fastened to the lower marginal portions of the panel 26 and the sill members 20. In the region of the connection of the lower ends of the stay bolts 106, the outer panel 26 and the sill 20 are appropriately reinforced by plates, bolt spacers and reinforcing brackets. The panel 26 has outwardly directed projections 109 which accommodate the lower ends of the stay bolts 106 and the spacers 108.

A shock absorber 110 of the so-called airplane type, has its lower end resiliently connected by rubber cushions 111 to a web 112 provided in the angle between the arms of the lower link 71. The upper end of the shock absorber is fastened by means of rubber cushions 113 in a recess 114 of the reinforcing member 103 and of the panel 26—Figures 1 and 2. The stub axle part 65 is rigidly connected to a steering lever 115.

The dashboard 28, the toe board 29 and the rearwardly adjacent portions 120 of the body floor panel proper all have their central portions 121, 122, 123 bent respectively rearwardly and upwardly so as to make room for the rear portions of the power unit. Parts of these portions 121, 122, 123 may be constituted by a customary removable cover (not shown) giving access to the change-speed gear and the clutch of the power unit 124.

At both sides of the portions 121, 122, 123 reinforcing members 125 are arranged which extend over a part of the vertical portion of the dashboard 28, over the toe board 29 and the forward portion of the floor panel 120. Each member 125 is a channel having a bottom wall 126 and marginal flanges 127 by which latter it is fastened such as by spot welding to the panels 28, 29 and 120.

The substantially horizontal rear portions of the members 125 are interconnected by a brace 129. This brace 129 is a channel having a bottom wall 130 and marginal flanges 131. The central portion of the brace is downwardly bent and provided in its interior with a rubber block 132 carrying an adhesively connected plate 133 attached to the rear end of the motor unit 124. The ends of the brace 129 are connected to the bottom walls 126 of the members 125 by means of bolts 134 passing through the widened ends of the flanges 131. Layers 135 of vibration dampening material are inserted between the flanges 131 and the walls 126.

From the drawing and the foregoing part of the description, it will have become apparent that the weight of the rear end of the motor unit is distributed by means of the brace 129 and the members 125 over a wide area of the dash-, toe-, and floor-board panels 28, 29, 120 and from there into the remainder of the body structure such as into the side panels 26 and the sill members 20, 20'. The vibrations of the motor are prevented from being transmitted into the body by means of the rubber block 132 and the inserts 135.

In the modification of the rear motor suspension as illustrated in Figures 6 to 9, the short brace 129 of the first embodiment is replaced by a long cross sill 138 likewise U-sectional with a bottom wall 139 and marginal flanges 140 and a motor supporting cushion 141 in its central section. This brace 133 is fastened by means of brackets 140' and resilient such as rubber cushions 142 to the members 125, and its ends are fastened by another set of resilient cushions 143 to the lower walls of the side sill members 20'. 144 is a bar attached to each brace 125 which protects the connection between the brace 138 and the member 125 and serves also, to a certain degree, as a protection for the driving unit against collision such as from ground obstacles.

This second arrangement gives a still wider distribution of the weight of the motor and a greater security against the transmission of vibrations owing to the number and the great supporting area of the rubber cushions 141, 142, 143.

The attached drawings show and the foregoing specification describes often the construction on the one side only of a longitudinal or transverse plane of symmetry, because it is deemed unnecessary to encumber the drawings and specification where the complementary structure on the other side of such plane is quite obvious to anyone skilled in the art.

It will be understood that the invention is liable to many modifications without departing from its principles. For instance, the new system of transmitting the stresses directly into the body panels may be applied to other types of bodies and it may, for instance, be used in cars where the motor is not located at the front end.

All those modifications and adaptations of the invention are intended to be covered by the appended claims, with the exception of such subject matter as is claimed in applicant's co-pending application Serial No. 402,877, filed July 17, 1941, for Wheel and motor suspension, especially for automobiles, of which the present application is a division.

What is claimed is:

1. In a vehicle body structure comprising a floor panel provided at one end with an upwardly directed panel extension, a pair of elongated reinforcing members attached to and extending longitudinally from substantially the region of said extension over a minor part only of said panel in the region adjoining said extension, said members being spaced from each other and from the side margins of the panel and to which means for the support of part of the driving gear may be attached.

2. In a vehicle body structure according to claim 1, comprising a cross member extending between and fastened to said reinforcing members as means for the support of part of the driving gear.

3. In a vehicle body structure comprising a floor panel integral with a body end wall, a pair of elongated reinforcing members angle shaped in side view having one arm attached to said floor panel and the other to said end wall, said members being transversely spaced from each other and from the side margins of said panel, extending over a minor part only of the length of the panel in the region adjoining said end wall and being adapted for the attachment of supports for parts of the driving gear.

4. In a vehicle body structure comprising a floor panel provided at one end with an upwardly directed panel extension and connected to through running side sill structures, a pair of elongated reinforcing members attached to and extending longitudinally over a minor part only of said panel in the region of said extension, said members being spaced from each other and arranged between said sill structures, a transverse member extending substantially over the entire width of the floor panel and having its ends attached to said sill structures and being in its middle region arranged beneath and fastened to said reinforcing members; said transverse member being adapted to support between said reinforcing members a portion of the driving mechanism of the vehicle.

THEODORE ULRICH.